Sept. 26, 1967     J. T. BASNETT     3,343,769
PARACHUTES
Filed Sept. 15, 1965     2 Sheets-Sheet 1
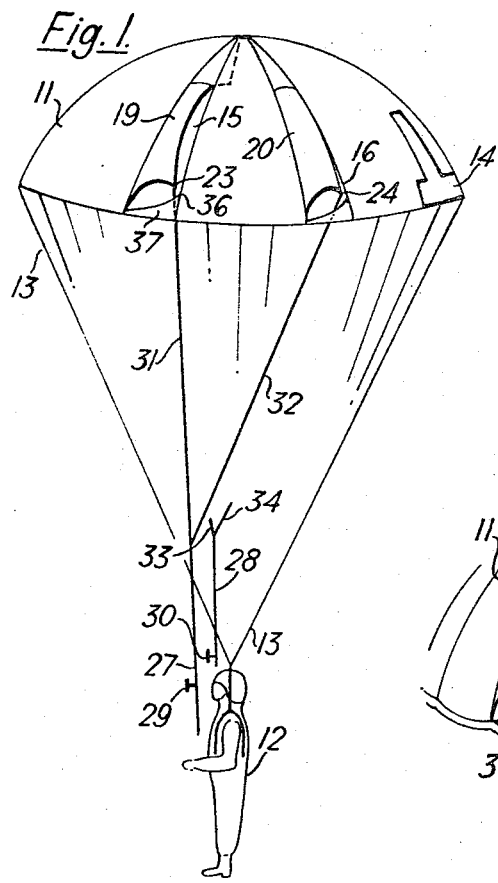
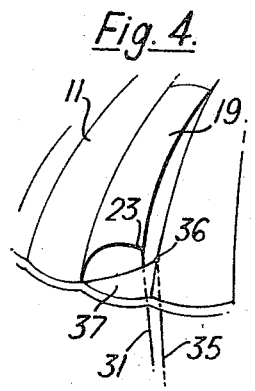
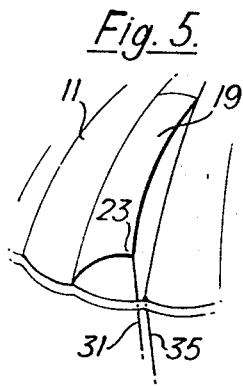
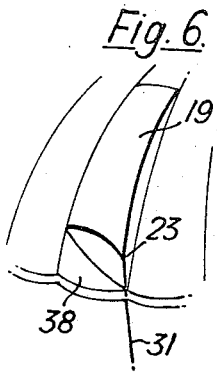
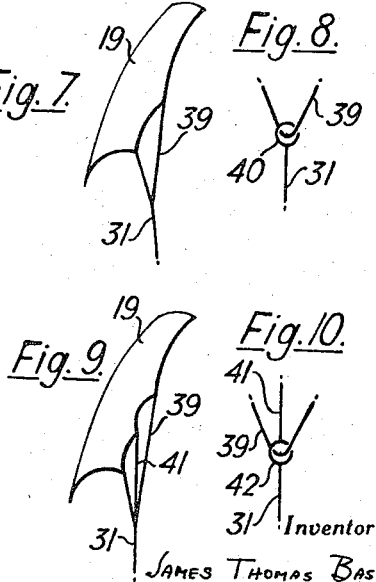
Inventor
JAMES THOMAS BASNETT
By
Shoemaker and Mattare
Attorneys Sept. 26, 1967  J. T. BASNETT  3,343,769
PARACHUTES Filed Sept. 15, 1965  2 Sheets-Sheet 2

Inventor
James Thomas Basnett
By
Shoemaker and Mattare
Attorneys

United States Patent Office 3,343,769
Patented Sept. 26, 1967

3,343,769
PARACHUTES
James Thomas Basnett, Woking, England, assignor to G.Q. Parachute Company Limited, Woking, England, a British company
Filed Sept. 15, 1965, Ser. No. 487,464
Claims priority, application Great Britain, Sept. 25, 1964, 39,128/64
7 Claims. (Cl. 244—152)

ABSTRACT OF THE DISCLOSURE

This invention relates to parachutes and particularly to parachutes provided with means by which the parachute can be steered and the drift speed of the parachute can be altered by the parachutist whilst the parachute is in flight.

More particularly, the invention relates to the guiding of parachutes by the parachutist through rigging lines connected to flap controlled openings in the canopy. The flaps are larger than the openings and may be moved by the parachutist from positions outside the canopy to positions inside the canopy while the parachute is in flight.

---

According to the invention a parachute comprises a canopy and rigging lines connecting the canopy to a parachutist, the canopy being provided with openings to allow the air to be spilled from the canopy and flaps which are larger than the openings and adjacent to them and which can be moved from positions outside the canopy to positions inside the canopy whilst the parachute is in flight.

Movement of the flaps from one extreme position to the other extreme position enables the parachutist in suitable conditions to reverse the direction of his flight, whilst intermediate positions of the flaps enable the rate and direction of flight to be varied.

The canopy can be provided with openings the size of which cannot be varied at will whilst the parachute is in flight in addition to the openings the size of which can be varied.

Figure 2:
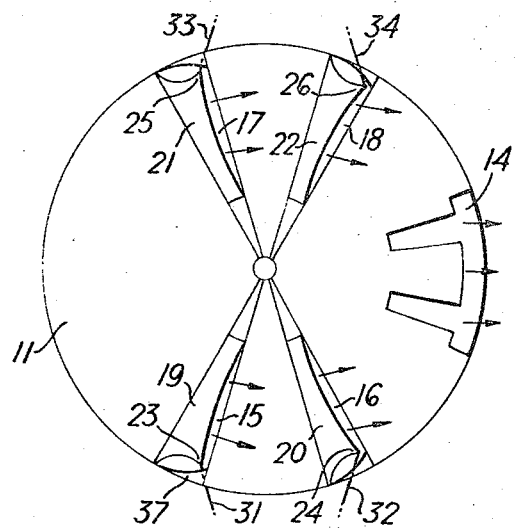
Figure 3:
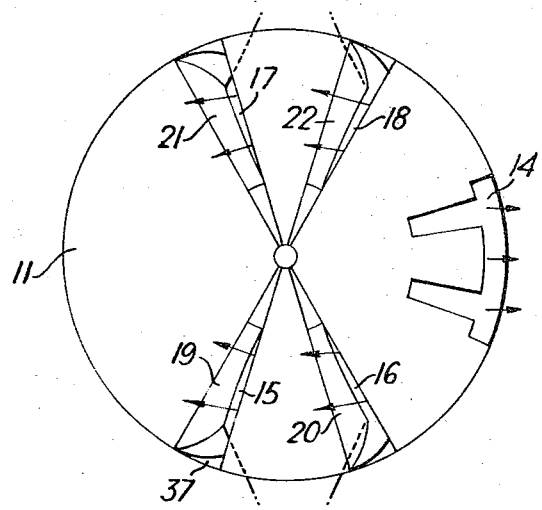

The invention will now be described with reference to the accompanying drawings of which FIGURE 1 shows a parachute according to the invention in flight, FIGURE 2 shows a plan view of the canopy of the parachute shown in FIGURE 1 with the flaps in the outside position, FIGURE 3 shows the same canopy with the flaps in the inside position, FIGURE 4 shows a portion of the canopy shown in FIGURE 1 and FIGURES 5, 6, 7, 8, 9, and 10 show various modifications that can be made to the openings and control lines.

The parachute shown in FIGURES 1, 2, and 3 comprises a canopy 11 which is connected to a parachutist 12 by rigging lines 13. The canopy has an opening 14 which gives the parachute a normal direction of flight away from the opening. The canopy also has openings 15, 16, 17, and 18 which are provided with flaps 19, 20, 21 and 22 respectively. These openings are provided in symmetrical positions in the canopy, two, 17 and 18, being on the right hand side of the canopy and the other two, 15 and 16, being on the left hand side of the canopy.

The flaps are larger than the openings with which they are associated, for example, the lower edge of the flap could be one and a half times as long as the length of the lower edge of its opening.

Control lines are connected to the free corners of the flaps; the free corner 23 of the flap 19 is connected by a line 31 to the control line 27; the free corner 24 of the flap 20 is connected by line 32 to control line 27; free corners 25 and 26 of flaps 21 and 22 are connected by lines 33 and 34 respectively to control line 28. The control lines 27 and 28 are provided with toggles 29 and 30 respectively which are within reach of the parachutist whilst the parachute is in flight.

When the flaps are outside the canopy as shown in FIGURES 1 and 2, air spills from the canopy in the direction indicated by the arrows on FIGURE 2 and the canopy travels at speed away from the opening 14. When the parachutist pulls the flaps to the inside positions the direction of the flow of air through the openings 15, 16, 17, and 18 is reversed as indicated by the arrows in FIGURE 3. This produces a braking effect on the canopy, and in suitable conditions could cause the parachute to reverse its direction of flight. By holding the flaps in intermediate positions, or in different positions on each side of the canopy, the parachutist can control his speed of drift, can rotate the parachute, and can make it glide in any desired direction.

Control lines can be connected to the corners of the openings as well as to the corners of the flaps if desired. Such a control line is shown at 35 in FIGURE 4 connected to the corner 36 of the opening 15 which is provided with flap 19 and control line 31 connected to corner 23. When the flaps are in the outside position the openings 15, 16, 17, and 18 can be made larger by pulling on these additional control lines. This increases the forward speed of glide of the parachute.

The openings 15, 16, 17, and 18 are formed with the corners such as 36 away from the peripheral hem of the canopy and with another corner on the peripheral hem. The openings need not be of this shape. For example, the lower edge could slope in the opposite direction as shown at 38 in FIGURE 6, or the opening could be parallel to the peripheral hem as shown in FIGURE 5.

The free corners of the flaps are shown in FIGURES 1 to 6 as being connected to the control lines and toggles by a single line such as 31. Additional lines can be connected to points along the edges of the flaps if desired. For example one additional line 39 is shown in FIGURE 7 connected to a point along the edge of the flap and to the line 31, whilst a modification of this arrangement is shown in FIGURE 8, the line 31 carrying a ring 40 and the line 39, which is connected to the corner of the flap and to a point along the edge of the flap, forming a loop which is passed through the ring 40. More than one additional line can be provided and arrangements in which two additional lines are supplied are shown in FIGURES 9 and 10. In FIGURE 9 additional lines 39 and 41 are connected to points along the edge of the flap and to the line 31. In FIGURE 10 the line 31 carries a ring 42, the line 39 passes through this ring and is connected to the corner of the flap and to a point along the edge of the flap, whilst line 41, which is connected to a point on the flap between the two connections to line 39, is fixed to the ring. Other arrangements of lines can be fitted.

I have found that two or four controlled openings are normally adequate, but the invention is not restricted to any particular number of controlled openings; six or more openings could be provided if desired. The controlled openings can extend the full length of the canopy from the hem to the apex if desired but I have found that an opening extending about two thirds of the distance between the hem and the apex is normally adequate. All the openings need not be of the same size although it is preferred to make symmetrical pairs of openings of the same size and shape. For example openings 15 and 17 could be similar in size and shape, as could openings 16 and 18, but opening 15 could be of a different size and shape to opening 16.

The rear opening shown in the drawings extends over five gores of the canopy, the openings on the second and fourth gores being longer than those on the first, third and fifth gores, but the invention is not restricted to a canopy having a rear opening, or, if one is provided, an opening of this particular shape or size.

Having described my invention, what I claim as new and desire to secure by Letters Patent is:

1. A parachute comprising a canopy and rigging lines connecting the canopy to a parachutist, the canopy being provided with openings to allow the air to be spilled from the canopy and flaps which are larger than the openings and adjacent to them, one flap being provided for each opening, and means operable by said parachutist to move said flaps from positions outside the canopy to positions inside the canopy whilst the parachute is in flight.

2. A parachute as claimed in claim 1 which is provided with a canopy having other openings the size of which cannot be varied at will by the parachutist whilst the parachute is in flight.

3. A parachute comprising a canopy and rigging lines connecting the canopy to a parachutist, the canopy being provided with openings symmetrically placed in the canopy and flaps adjacent these openings, the flaps being larger than the openings with which they are associated and having control lines connected to points on the flaps which control lines are brought within the reach of the parachutist so that the parachutist can operate the control lines whilst the parachute is in flight and move the flaps from positions outside the canopy to positions inside the canopy as desired.

4. A parachute comprising a canopy and rigging lines connecting the canopy to a parachutist, the canopy being provided with openings which extend part of the way from the hem of the canopy towards the apex of the canopy and which are triangular in shape, flaps of roughly the same shapes as the openings but which are larger than the openings with which they are associated, control lines connected to points on the flaps which control lines enable the parachutist to move the flaps from positions outside the canopy to positions inside the canopy as desired.

5. A parachute as claimed in claim 3 in which the canopy is provided with further control lines connected to the corners of the openings which enable the openings to be increased in size whilst the parachute is in flight.

6. A parachute comprising a canopy and rigging ilnes connecting the canopy to a parachutist, the canopy being provided with openings symmetrically placed in the canopy and flaps adjacent these openings, the flaps being larger than the openings with which they are associated, control lines connected to points on the flaps which control lines enable the parachutist to move the flaps from positions outside the canopy to positions inside the canopy whilst the parachute is in flight, other openings the size of which cannot be varied at will by the parachutist whilst the parachute is in flight, and further control lines connected to points on the openings by which the sizes of the openings can be varied by the parachutists whilst the parachute is in flight.

7. A parachute as claimed in claim 6 in which the openings provided with flaps extend part of the way from the peripheral hem of the canopy to the apex of the canopy.

References Cited

UNITED STATES PATENTS 1,194,691   8/1916   Adams _____ 244—145

FOREIGN PATENTS 144,792   6/1920   Great Britain.

MILTON BUCHLER, *Primary Examiner.*

A. E. CORRIGAN, R. A. DORNON,
*Assistant Examiners.*